United States Patent
Fisher et al.

(10) Patent No.: US 9,932,120 B2
(45) Date of Patent: Apr. 3, 2018

(54) METHOD AND APPARATUS FOR CONTROLLING A TURBOPROP ENGINE

(71) Applicant: Unison Industries, LLC, Jacksonville, FL (US)

(72) Inventors: Edward Aaron Fisher, Jacksonville, FL (US); Scott Brian Wright, Ponte Vedra Beach, FL (US); James Robert Turner, Jacksonville, FL (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 15/028,611

(22) PCT Filed: Sep. 23, 2014

(86) PCT No.: PCT/US2014/056852
§ 371 (c)(1),
(2) Date: Apr. 11, 2016

(87) PCT Pub. No.: WO2015/053930
PCT Pub. Date: Apr. 16, 2015

(65) Prior Publication Data
US 2016/0229547 A1      Aug. 11, 2016

Related U.S. Application Data

(60) Provisional application No. 61/889,707, filed on Oct. 11, 2013.

(51) Int. Cl.
*B64D 31/00*      (2006.01)
*B64D 31/06*      (2006.01)
(Continued)

(52) U.S. Cl.
CPC ........... *B64D 31/06* (2013.01); *B64C 11/303* (2013.01); *B64C 11/305* (2013.01); *F01D 5/02* (2013.01);
(Continued)

(58) Field of Classification Search
None
See application file for complete search history.

(56) References Cited

U.S. PATENT DOCUMENTS 2,694,900 A   11/1954 Brandau
2,740,483 A    4/1956 Machlanski
(Continued)

FOREIGN PATENT DOCUMENTS

EP        1787906 A2    5/2007

OTHER PUBLICATIONS

Povazan et al., "Introduction to advanced modeling and control of turbo-prop engines", INES IEEE 16th International Conference on Intelligent Engineering Systems, Lisbon, Portugal, pp. 271-277, Jun. 2012.
(Continued)

*Primary Examiner* — Jonathan M Dager
(74) *Attorney, Agent, or Firm* — GE Global Patent Operation; William S. Munnerlyn (57) ABSTRACT

A turboprop control system 10 for use with a turboprop 2 having a turbine engine 12 operably coupled to and rotationally driving a propeller 14 having variable pitch blades 16 to control the engine speed, propeller speed, and propeller pitch. The pilot provides, by a single power control lever 30, the control input used to control the engine and propeller.

30 Claims, 6 Drawing Sheets

(51) Int. Cl.
   *B64C 11/30* (2006.01)
   *F02C 9/00* (2006.01)
   *F01D 5/02* (2006.01)
   *F04D 27/00* (2006.01)
   *F04D 29/32* (2006.01)
   *F04D 29/36* (2006.01)
(52) U.S. Cl.
   CPC .............. *F02C 9/00* (2013.01); *F04D 27/004* (2013.01); *F04D 29/325* (2013.01); *F04D 29/362* (2013.01); *F05D 2220/324* (2013.01); *F05D 2220/325* (2013.01); *F05D 2220/36* (2013.01); *F05D 2260/70* (2013.01); *F05D 2270/02* (2013.01); *F05D 2270/70* (2013.01)

(56) References Cited

U.S. PATENT DOCUMENTS

| | | | | |
|---|---|---|---|---|
| 2,941,601 | A | | 6/1960 | Best |
| 4,958,289 | A | * | 9/1990 | Sum ..................... B64C 11/305 416/27 |
| 5,209,640 | A | * | 5/1993 | Moriya ................... B64C 11/40 416/27 |
| 5,299,911 | A | * | 4/1994 | Moriya ................... B64C 11/44 416/35 |
| 5,315,819 | A | * | 5/1994 | Page ........................ F02C 9/28 416/30 |
| 5,465,211 | A | * | 11/1995 | Byrne, Jr. ............. G05D 1/0808 244/178 |
| 5,595,474 | A | * | 1/1997 | Girard .................... B64C 11/44 416/1 |
| 5,779,446 | A | * | 7/1998 | Althof ..................... F01D 7/00 416/162 |
| 5,931,637 | A | * | 8/1999 | Wheeler ................. B63H 3/06 416/161 |
| 5,967,749 | A | * | 10/1999 | Eaves ...................... B63H 3/06 416/155 |
| 5,997,250 | A | * | 12/1999 | Carter, Jr. ............... B64C 11/40 416/1 |
| 6,171,055 | B1 | * | 1/2001 | Vos .......................... F02C 9/44 416/1 |
| 6,422,816 | B1 | * | 7/2002 | Danielson ............. B64C 11/301 415/36 |
| 6,439,850 | B1 | * | 8/2002 | McCallum ........... F04D 29/063 416/144 |
| 6,672,835 | B1 | * | 1/2004 | Hughes ................. B64C 11/301 416/155 |
| 8,083,482 | B2 | * | 12/2011 | Serven ...................... F02C 9/58 290/55 |
| 8,459,038 | B1 | * | 6/2013 | Lickfold ................. F02K 3/025 60/772 |
| 9,475,572 | B2 | * | 10/2016 | Collingbourne ...... B64C 11/305 |
| 9,488,054 | B2 | * | 11/2016 | Corpron ................... F01D 5/12 |
| 2002/0088225 | A1 | * | 7/2002 | Koch .................... B64C 11/305 60/602 |
| 2004/0255580 | A1 | * | 12/2004 | Bayerl ................. B64C 11/303 60/602 |
| 2005/0254948 | A1 | * | 11/2005 | Koch ...................... F02D 29/02 416/144 |
| 2010/0014976 | A1 | * | 1/2010 | Arel ....................... B64C 11/38 416/117 |
| 2011/0208400 | A1 | * | 8/2011 | Lickfold .................. F02C 9/32 701/100 |
| 2013/0323050 | A1 | * | 12/2013 | Kleckler .................. F02C 9/58 416/1 |
| 2015/0013306 | A1 | * | 1/2015 | Shelley .................... F02K 5/00 60/224 |
| 2016/0059960 | A1 | * | 3/2016 | Fearn .................... B64C 27/022 244/17.11 |

OTHER PUBLICATIONS

International Search Report and Written Opinion issued in connection with corresponding PCT Application No. PCT/US2014/056852 dated Dec. 16, 2014.

* cited by examiner

METHOD AND APPARATUS FOR CONTROLLING A TURBOPROP ENGINE

CROSS REFERENCE TO RELATED APPLICATIONS

This application is a national stage application under 35 U.S.C. § 371(c) of prior filed, co-pending PCT application serial number PCT/US2014/056852, filed on Sep. 23, 2014, which claims priority to U.S. Provisional Patent Application Ser. No. 61/889,707, filed Oct. 11, 2013. The above-listed applications are herein incorporated by reference.

BACKGROUND

Turbopropeller, or "turboprop" engines may be employed on aircraft to provide thrust necessary for flying. The turboprop engine typically consists of a gas turbine engine, or gas generator, burning air and fuel to generate an exhaust gas flow that drives an aerodynamically-coupled power turbine, or propeller turbine, which is further coupled to a set of propeller blades. In this sense, the speed of the gas generator indirectly affects the speed of the power turbine by providing torque to drive the propeller, thus providing thrust.

The pitch of the propeller blades may also be rotated on the propeller shaft to provide additional thrust at the expense of increasing the torque demand of the turbine shaft. For instance, if the pitch of the propeller blades is reduced, each blade rotates on the propeller shaft such that the air resistance of the blade as it rotates about the shaft decreases, and thus, reduces the torque demand for the shaft. In the instance where the gas generator speed is constant, the reduced torque demand of the propeller results in increased propeller shaft RPMs. Conversely, if the pitch of the propeller blades is increased, each blade rotates on the propeller shaft such that the air resistance of the blade as it rotates about the shaft increases, and thus, increases the torque demand for the shaft. In the instance where the gas generator speed is constant, the increased torque demand of the propeller results in decreased propeller shaft RPMs.

Turboprop control systems may employ dual control levers used by the pilot to adjust, respectively, the gas generator speed demand, i.e. the speed of the gas turbine engine, and the propeller speed demand, i.e. via the pitch of the propeller blades. This dual-lever control system allows for variation of aircraft speed and torque demand during, for instance, takeoff, cruise, and/or reverse thrust operations.

BRIEF DESCRIPTION

In one embodiment, the innovation relates to a method for controlling the operation of an aircraft turboprop engine having a turbine engine operably coupled to and rotating a propeller. The method includes receiving a position input from a single input device on a flight deck of the aircraft, converting the position input into a turbine engine setting and a propeller setting, controlling rotational speed of the turbine engine according to the turbine setting, and controlling at least one of propeller speed and pitch according to the propeller setting.

In another embodiment, the innovation relates to a turboprop control system for use with a turboprop having a turbine engine operably coupled to and rotationally driving a propeller having variable pitch blades to control the engine speed, propeller speed, and propeller pitch. The turboprop control system includes a control input device, located within a cockpit of an aircraft, and having an operational range and providing a control signal indicative of an input selection within the operational range, and a controller receiving the control signal and having an engine speed map and a propeller speed map as a function of the control signal. The controller applies the engine speed map and the propeller speed map to the received control signal to set an engine speed and a propeller speed for the turboprop.

DETAILED DESCRIPTION

The innovation may be implemented in any environment using a turbopropeller, or "turboprop" where the propeller speed may be set independently of the engine speed, with the engine being used as the source of power for rotating the propeller. While this description is primarily directed toward an aircraft or airplane having a turboprop providing thrust generation for flight in an aircraft environment, embodiments of the innovation are also applicable to any gas turbine engine providing a driving force, thrust, and/or power generation.

Figure 1:
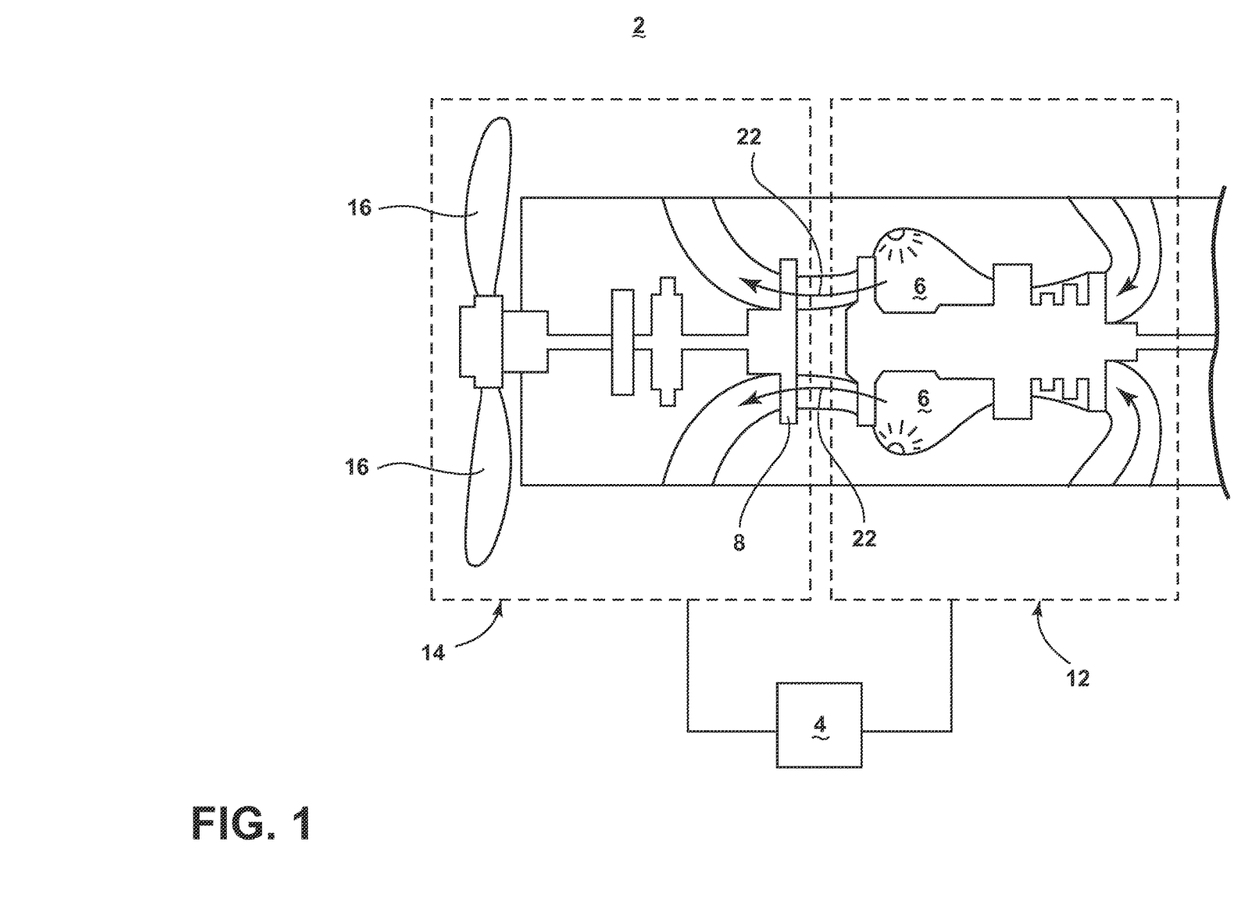
FIG. 1 is a schematic representation of a turboprop engine and propeller assembly in accordance with various aspects described herein.

FIG. 1 illustrates an exemplary turboprop 2, such as a model GE-H80, having a gas generator, or turbine engine 12, a propeller 14 having variable pitch propeller blades 16, and a controller 4 configured to control each of the engine 12 and propeller 14. The turbine engine 12 and propeller 14 may be operably coupled to each other such that the engine 12 may rotationally drive the propeller 14. The coupling between the turbine engine 12 and the propeller 14 may not be a mechanical coupling. For instance, as shown, the turbine engine 12 and propeller 14 may be a free turbine that is coupled by an aerodynamic coupling 22, illustrated as arrows demonstrating airflow, wherein a turbine engine 12 combustion section 6 produces exhaust gases which are used to drive a power turbine 8. While a free turbine is shown, embodiments of the innovation may also be applicable to any motor or engine directly or indirectly driving an element, such as a propeller, and the motor speed and element speed are independently controlled.

As is typical for a turboprop 2 aircraft, the propeller blades 16 may use a variable pitch mechanism to alter the pitch angle of the blades 16 as the turbine engine 12 speed and propeller 14 speed changes. This may be accomplished through the operation of a governor, such as a flywheel-type pitch governor and speeder spring. In this sense, the varying pitch angle of the blades 16 provides for maximum lift-to-drag ratio on the blades 16, while limiting the RPMs of the turbine engine 12 to generate the torque necessary to rotate the propeller 14. Additionally, it is envisioned that the propeller blades 16 may reverse the pitch angle in order to generate a reverse thrust by rotation of the propeller 14.

Figure 2:
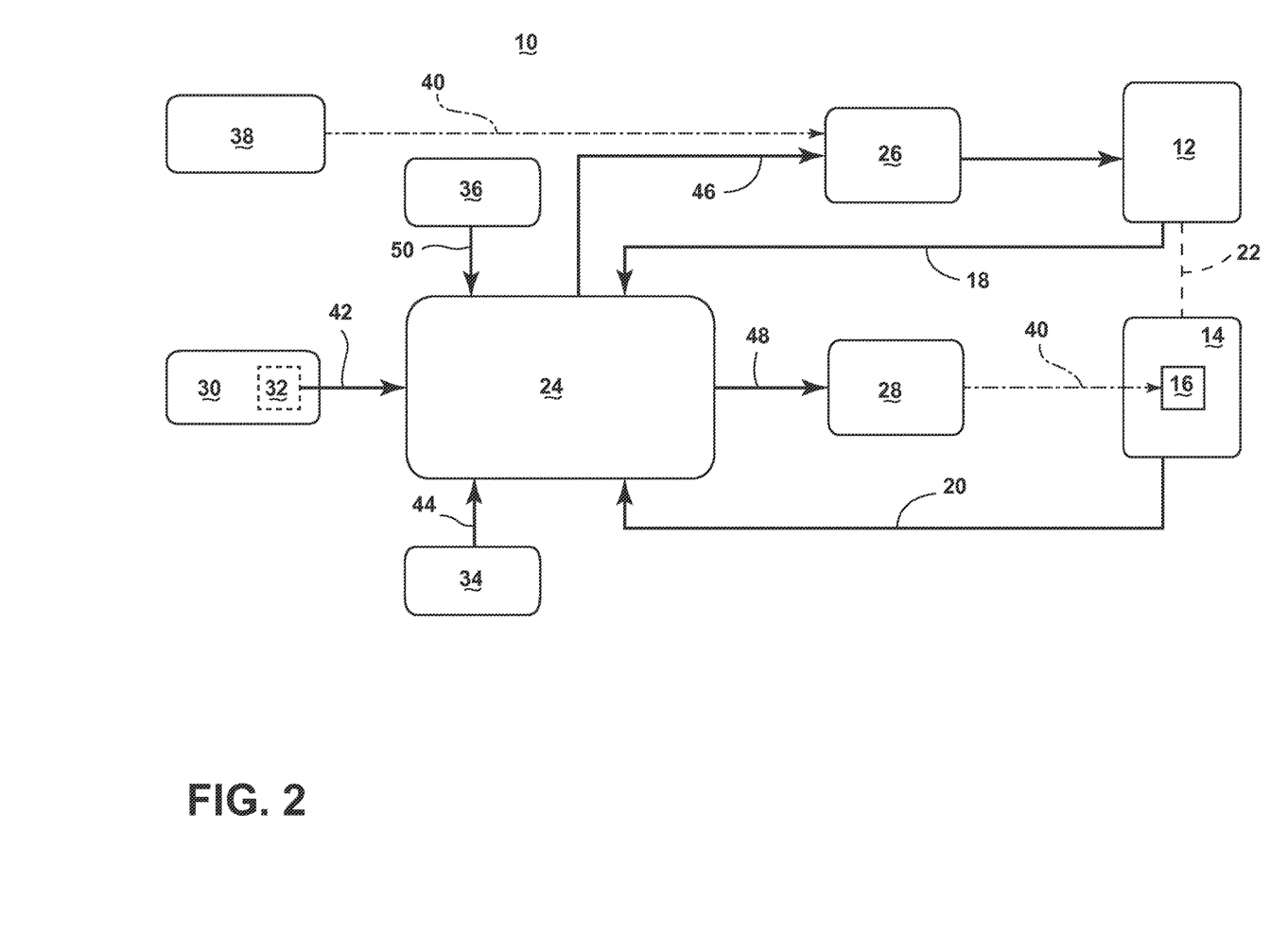
FIG. 2 is a schematic representation of a turboprop control system in accordance with various aspects described herein.

FIG. 2 illustrates a schematic representation of a turboprop control system 10 in accordance with one embodiment of the innovation. As shown, the turboprop control system 10 comprises the turbine engine 12 and the turboprop propeller 14 having the propeller blades 16, wherein the engine 12 and propeller 14 are connected via an aerodynamic coupling 22, illustrated as a dotted line, and wherein rotation of the engine 12 and propeller 14 each relate to the generated thrust from the propeller 14, for the aircraft. In this sense, each of the turbine engine 12 and propeller 14 may independently alter the thrust generated by the turboprop 2. For example, increasing or decreasing the pitch angle of the propeller blades 16 while keeping a constant turbine engine 12 speed may contribute to generating more or less thrust, respectively. Similarly, increasing or decreasing the turbine engine 12 speed while keeping a constant pitch angle of the propeller blades 16 may also contribute to generating more or less thrust, respectively. Due to the free turbine configuration of the turboprop 2, it is envisioned that the turbine engine 12 and propeller 14 may not rotate with the same frequency or speed. Additionally, it is envisioned that the turbine engine 12 may be capable of generating an engine speed signal 18 representative of the operating speed, for instance, in RPMs, of the engine 12. Likewise, it is envisioned that the propeller 14 may be capable of generating a propeller speed signal 20 representative of the operating speed, for instance, in RPMs, of the propeller 14.

The turboprop control system 10 may further comprise a controller, such as an engine electronic controller (EEC) 24, a fuel metering unit 26, an electric propeller governor 28, a control input device, such as a single, pilot-controllable, power control lever 30 having a positional sensor 32, an altitude sensor 34, and a fuel sensor 36. The EEC 24 is electrically coupled with the electric propeller governor 28, positional sensor 32 of the power control lever 30, altitude sensor 34, fuel sensor 36, fuel metering unit 26, turbine engine 12, and propeller 14. The fuel metering unit 26 is further electrically connected to the turbine engine 12. The electric propeller governor 28 is additionally connected via a mechanical interface 40 (shown as a dashed line) with the propeller blades 16 of the propeller 14.

The turboprop control system 10 may also optionally include a pilot-controllable emergency control lever 38 connected to the fuel metering unit 26 via a mechanical interface 40, for manual or emergency control operation of the aircraft.

The power control lever 30 may be a pilot-accessible mechanical lever, for instance, located in the cockpit or flight deck of an aircraft, which allows the pilot to provide input to control the turboprop control system 10 by physically moving the lever through a predetermined physical range of motion corresponding to the operation range of the system 10. The power control lever 30 physical range of motion may additionally comprise a first portion or range, wherein moving the lever 30 into the first portion corresponds to a forward movement of the aircraft, and a second portion or range, wherein moving the lever 30 into the second portion corresponds to a rearward movement of the aircraft. The positional sensor 32 of the power control lever 30 may be configured to detect or convert the position of the mechanical lever 30, relative to the operational range of the lever 30 motion (in both the first position and second position), and generate an output signal, such as an control signal 42, indicative of the position of the lever 30.

For example, the power control lever 30 in accordance with one embodiment of the innovation may comprise a lever anchored at the lever pivot, and rotatable over 88 degrees, wherein the foremost 44 degrees of rotation (relative to the pilot) may provide the first portion in the range of motion, while the rearmost 44 degrees may provide the second portion, or reverse, range of motion. The positional sensor 32 may, in turn, generate a control signal 42 that may range from −44 to +44, wherein the 0 to +44 range defines the first position (corresponding to forward movement) and the 0 to −44 range defines the second position (corresponding to rearward movement). While a lever is described for both the power control lever 30 and emergency control lever 38, additional input devices allowing for pilot input are envisioned, such as a dial or knob. Additionally, it is envisioned that particular positions of the power control lever 30 may define different flight regimes, such as taxi, cruise, and takeoff. One non-limiting example of power control lever 30 positions may include a position between 0 and 20 degrees represent taxi operation, at or between 21 and 30 degrees represents cruise operation, and at 44 degrees represents takeoff operation.

The EEC 24 may receive one or more electrical inputs from each of the power control lever 30, altitude sensor 34, fuel sensor 36, turbine engine 12 and propeller 14. For example, as shown, the EEC 24 may receive the control signal 42 from the power control lever 30, an altitude signal 44 from the altitude sensor 34, a fuel input signal 50 from the fuel sensor 36, the engine speed signal 18 from the turbine engine 12, and the propeller speed signal 20 from the propeller 14.

The EEC 24 may use the aforementioned input signals 18, 20, 42, 44 to generate output signals for additional turboprop control system 10 components. This may include generating a fuel control signal 46, supplied to the fuel metering unit 26, a propeller control signal 48, supplied to the electric propeller governor 28. The fuel metering unit 26 may be configured to increase or decrease the operation of the turbine engine 12 in response to the fuel control signal 46 and/or the mechanical interface 40 of the emergency control lever 38. For example, the fuel metering unit 26 may increase the turbine engine 12 rotational speed by increasing the amount of fuel supplied to the engine 12, or conversely, decrease the rotational speed by supplying less. Likewise, the electric propeller governor 28 may be configured to alter the pitch of the propeller blades 16, and consequently the propeller 14 RPMs, by increasing or loosening the governor spring tension in response to the propeller control signal 48.

Figure 3:
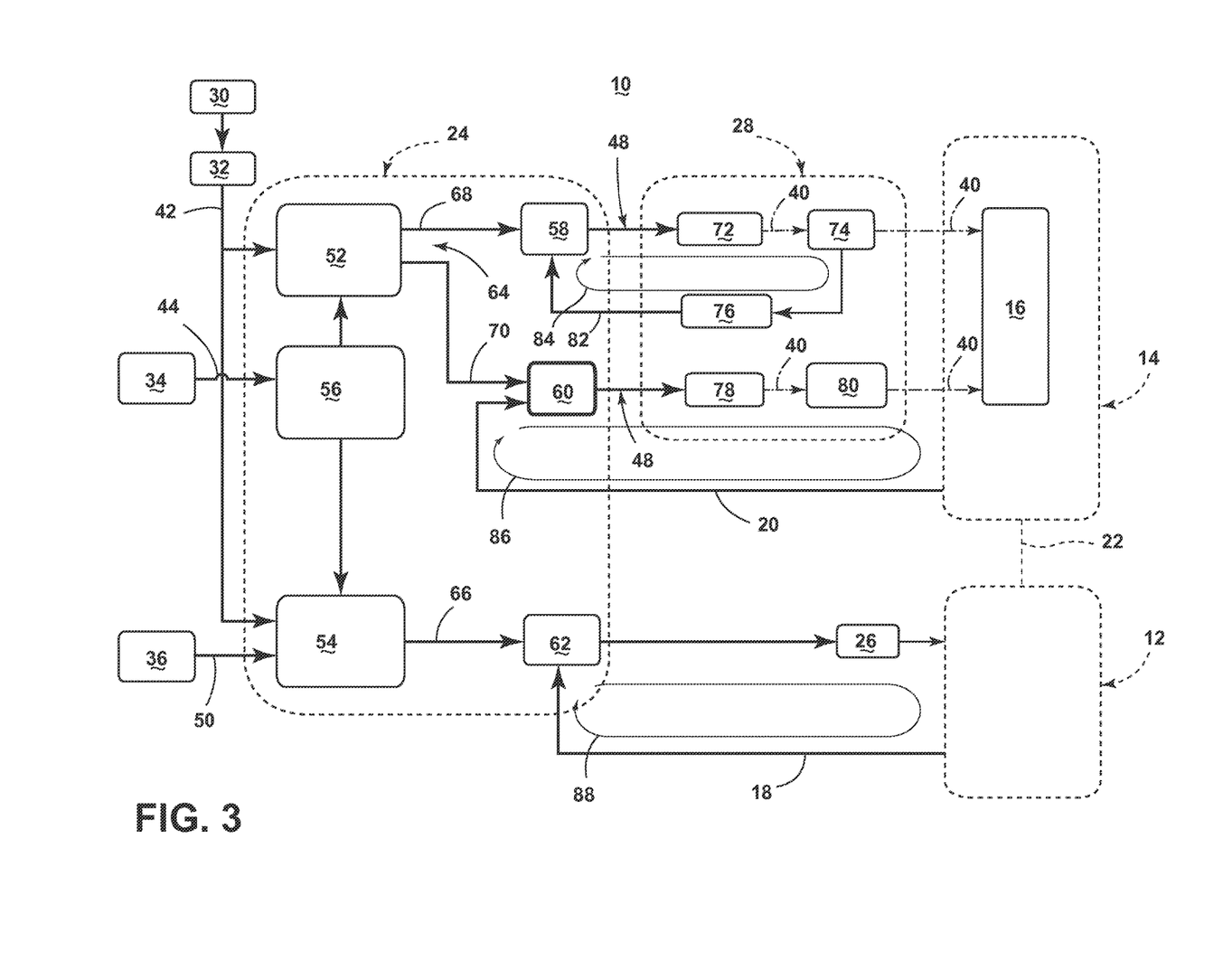
FIG. 3 is a schematic representation showing additional details of the turboprop control system in accordance with various aspects described herein.

Turning now to FIG. 3, the EEC 24 may further comprise a propeller speed map 52, an engine speed map 54, an altitude compensator 56, a reverse propeller controller 58, a forward propeller controller 60, and an engine controller 62. The propeller speed map 52 is shown electrically coupled to each of the positional sensor 32, the reverse propeller controller 58, the forward propeller controller 60 and the altitude sensor 34, via the altitude compensator 56. The engine speed map 54 is shown electrically coupled with the fuel sensor 36, the altitude sensor 34, via the altitude compensator 56, and the engine controller 62. The reverse propeller controller 58 is further electrically coupled with the electric propeller governor 28, and the forward propeller controller 60 is further coupled with the governor 28 and the propeller 14. The engine controller 62 is additionally coupled with the fuel metering unit 26 and the turbine engine 12.

The propeller speed map 52 and engine speed map 54 each operate as a demand map, or look-up table, and may be configured with predetermined or dynamic profiles or setting values, for instance, via an implementation of an algorithm. Each of the propeller speed and engine speed maps 52, 54 may additionally define limitations to aircraft operation. For example, the propeller speed map 52 or engine speed map 54 may provide limited maximum and/or minimum thrust or speed utilized during taxi, cruise, or takeoff. In another example, the propeller speed map 52 or engine speed map 54 may define a maximum and/or minimum engine 12 speed or propeller 14 speed and pitch utilized during ground idle. In another example, the propeller speed map 52 may define a constant propeller 14 speed with an adjusting propeller blade 16 pitch value. Alternatively, the propeller speed map 54 may provide a constant propeller blade 16 pitch value with a varying the propeller 14 speed. In yet another example, the propeller speed map 54 may provide a varied speed and/or pitch in either a forward or a reverse thrust operation. In even yet another example, the propeller speed map 52 may employ multiple maps, wherein, for instance, a forward control signal 42 utilizes a first propeller speed map while a reverse control signal 42 utilizes a second propeller speed map. In even yet another example of limitations, the maps 52, 54 may be configured to prevent excess or undesirable temperature conditions on the turbine engine 12 and/or overtorque and/or overspeed on the propeller 14. Any combination of the above exampled maxima and/or minima values relating to the desired propeller speed and/or desired engine speed signals 64, 66, are envisioned.

The propeller and/or engine speed maps 52, 54 may additionally define profiles of operation, wherein, for example, the maps 52, 54 are configured to provide setting values for optimal aircraft, engine, and/or propeller efficiency. For example, the propeller speed map 52 may be configured to provide an optimized propeller speed for a corresponding engine speed map 54 value. The optimized profiles may additionally take into account additional sensor values, for instance, relating to air speed, altitude, etc., to provide an optimal engine 12 speed, propeller 14 speed, and propeller blade 16 pitch for, for example, an optimized fuel efficiency profile, an optimized thrust profile, an optimized audible profile (i.e. by controlling pitch of the propeller blades 16), or an optimized flight time efficiency profile. The optimization profiles may be further delineated by a given control signal 42. It is envisioned the optimized profiles may be user-selectable by the pilot. Additional optimized profiles are envisioned.

Additionally, one or both speed maps 52, 54 may be configured to provide for a linear thrust response, that is, a linear thrust relative to the position of the power control lever 30. This thrust response may be linear in forward or reverse thrust operation. In this sense, "linear" may refer to the overall thrust which, as explained above, is affected by the turbine engine 12, propeller 14, and propeller blade 16 configurations. Thus, a linear thrust may not be proportionally related to, for example, only a change in one component 12, 14, 16 of the configuration. Additionally, "linear" may define a maximum allowable change in setting values, regardless of how much change or how quickly change was requested via the power control lever. In this instance, a "linear" thrust response may only allow for a 1% increase in engine power per second. In another sense, "linear" may define the feedback response from the perspective of the pilot. For instance, a pilot may define a feeling of "linear" thrust response as, for example, a 1% increase in thrust for one second, followed by a 2% increase in thrust for 3 seconds. Furthermore, this thrust response may be different depending on the status, or flight regime, of the aircraft (e.g. taxi, cruise, takeoff, etc.).

As illustrated, each of the propeller speed map 52 and engine speed map 54 receive the control signal 42 from the power control lever 30 in addition to receiving a signal from the altitude compensator 56, and are capable of determining a respective desired propeller speed signal 64, or propeller setting, and a desired engine speed signal 66, or turbine engine setting, in response to, or as a function of, the received inputs. While the desired engine speed signal 66 may define a speed for the turbine engine 12, for instance, in RPMs, it is envisioned the desired propeller speed signal 64 may define a speed for the propeller 14, for instance, in RPMs, and/or a propeller pitch for the propeller blades 16, for instance, in degrees.

As shown, the desired propeller speed signal 64 may further comprise a desired reverse pitch signal 68 supplied from the propeller speed map 52 to the reverse propeller controller 58 and/or a desired forward speed signal 70 supplied from the map 52 to the forward propeller controller 60. The forward propeller controller 60 further receives the propeller speed signal 20 from the propeller 14, and each of the reverse and forward propeller controller are capable of non-simultaneously generating a propeller control signal 48 supplied to the electric propeller governor 28. Either desired speed and/or pitch signal 70, 68 may include desired speed aspects, for instance, a desired number of RPMS, as well as desired pitch aspects, for instance, a desired pitch of the propeller blades 16 in degrees.

The electric propeller governor 28 is illustrated further including a first motor 72, a gear drive assembly such as a worm drive 74 or worm gear, an optional gear drive positional sensor 76, and a second motor 78 coupled with a propeller governor assembly 80, for instance, via the governor spring. As used herein, the worm drive 74 may be configured to indirectly rotate the propeller blades 16 to a negative pitch angle via a mechanical interface 40, for example, via a hydraulic servo actuator, such that rotation of the propeller 14 would generate negative thrust.

The first motor 72 may receive a propeller control signal 48 from the reverse propeller controller 58, and the first motor 72 may drive the worm drive 74, via a mechanical interface 40. The worm drive 74 may be further connected with the propeller blades 16, via another mechanical interface 40. The optional gear drive positional sensor 76 may detect the position or operation of the worm drive 74, and supply a worm drive position signal to the reverse propeller controller 58.

Similarly, the second motor 78 may receive a propeller control signal 48 from the forward propeller controller 60, and the second motor 78 may alter the operation of the propeller governor assembly 80 via a mechanical interface 40, for instance, by altering the governor spring, or speeder spring. The propeller governor assembly 80, in turn, operates to adjust the pitch of the propeller blades 16, via another mechanical interface 40. The first and second motors 72, 78 may be any motors capable of providing mechanical motion in response to an electrical input signal, such as a servo motor. Additional motors, for instance employing open or closed loop feedback control, are envisioned.

The collective EEC 24, electric propeller governor 28, turbine engine 12, and propeller 14 define a closed loop turbine control system 10. For instance, the reverse propeller controller 58, first motor 72, worm drive 74 and gear drive positional sensor 76 may form a first loop 84, wherein the loop 84 receives the desired reverse pitch signal 68 input and provides output to the propeller blades 16. Additionally, the forward propeller controller 60, second motor 78, propeller governor assembly 80, and propeller 14 may form a second loop 86, wherein the loop 84 receives the desired forward speed signal 70 and provides output to the propeller blades 16. The engine controller 62, fuel metering unit 26, and turbine engine 12 may form a third loop 88, wherein the loop 88 receives the desired engine speed signal 66 input and provides output to the turbine engine 12. Each loop 84, 86, 88 may, for example, operate with a leading or trailing algorithmic response, which is define by and implemented by the respective reverse propeller controller 58, forward propeller controller 60, and/or engine controller 62.

Figure 4:
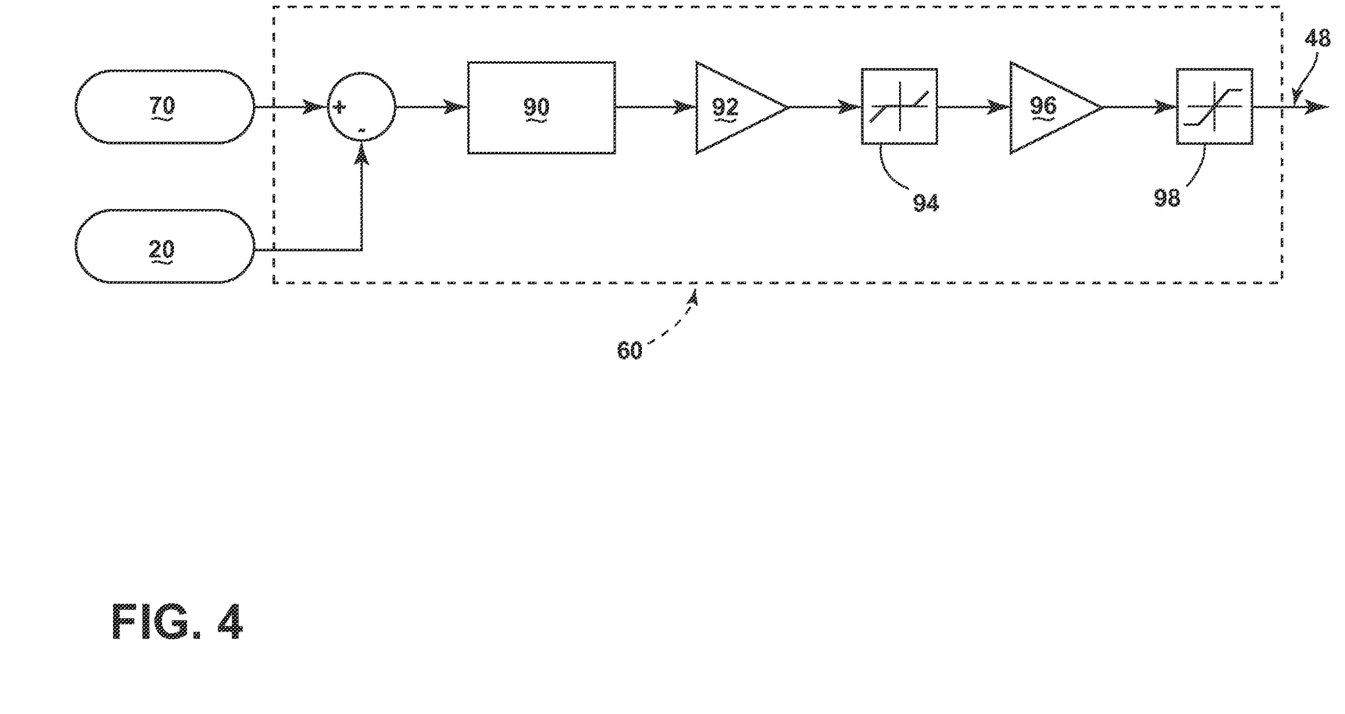
FIG. 4 is a schematic representation of a forward propeller controller, in accordance with various aspects described herein.

FIG. 4 is a schematic representation of the forward propeller controller 60, however it is equally applicable to describe all three controllers 58, 60, 62 of each respective loop 84, 86, 88. The forward propeller controller 60 may further comprise a controller having, and capable of applying, an algorithmic equation, for instance, a second order phase-lead controller 90, a first amplifier 92, a dead-zone function 94, a second amplifier 96, and a saturator 98.

As shown, the controller 60 receives inputs of the desired forward propeller speed signal 70 and the sensed, or actual, propeller speed signal 20. Inside the forward propeller controller 60, the signals 20, 70 are summated (wherein the propeller speed signal 20 value is a negative signal value). The summation is coupled with the second order phase-lead controller 90, which provides an output to the first amplifier 92. The first amplifier 92 provides output to the dead-zone function 94, which is configured to provide a variable output signal, except when the input signal is between an upper and lower defined signal boundary (i.e. the "dead-zone"), in which case, the function 49 provides an output signal of, for instance, zero or neutral. The dead-zone function 94 provides an output to the second amplifier 96, which may be further coupled with the saturator 98, which may be to saturate any input values to one of three output values: a positive value (i.e. +28 VDC), a negative value (i.e. −28 VDC), or a neutral value (i.e. 0 VDC). Thus the propeller control signal 48 output may typically be one of a positive value, negative value, or neutral value.

The forward propeller controller 60 operates to initially summate the input values of the desired forward propeller signal 70 and propeller speed signal 20 such that the output provides any difference between the two values. It is envisioned that both signals arrive at the forward propeller controller 60 with a common reference measurement, for instance, speed as measured in RPMs, however, it is envisioned that the controller may perform calculations to place each signal 20, 70 in a common reference measurement. Next, the second order phase-lead controller 90 uses an algorithmic equation to compute, or shape, the algorithmic response to the difference between the input signals 20, 70. The algorithmic equation can be a suitable transfer function, which would need to be determined for each system, as the transfer function is dependent on the response rate of the particular elements forming the controller 60, the dynamics of the system being controlled, and the desired response to input.

The algorithmic response is transmitted to the first amplifier 92, which amplifies the signal, for example, by 1000. Next, the amplified signal is transmitted to the dead-zone function 94, which typically will produce one of three output signals in response to the input signal: a high signal, low signal, or neutral signal. The output signal of the dead-zone function 94 is amplified by the second amplifier 96, for example, by 10000, and saturated by the saturator 98 to one of the positive value, negative value, or neutral value.

For example, if the desired forward speed signal 70 is greater than the propeller speed signal 20, the summation will produce a positive signal (e.g. greater than 0 VDC). The second order phase-lead controller 90 will likely produce a positive signal as well, which will then be amplified by the first amplifier 92 to a large positive signal. This large positive signal is unlikely to fall into the "dead-zone" of the dead-zone function 94, which is typically near a neutral signal. The large positive signal is also likely amplified by the second amplifier 96, and will thus be saturated to a positive value by the saturator 98. Conversely, if the desired forward speed signal 70 is less than the propeller speed signal 20, the summation will produce a negative signal (e.g. less than 0 VDC). Using a similar analysis as above, the negative signal is also unlikely to fall into the "dead-zone" of the dead-zone function 94, and ultimately generate a negative value by the saturator 98.

A third example is provided wherein the desired forward speed signal 70 is equal, or nearly equal to the propeller speed signal 20. In this example, the summation will produce a neutral, or near-neutral signal (e.g. 0 VDC), which will fall into the "dead-zone" of the dead-zone function 94. The dead-zone function 94 will thus output a neutral signal, which by definition is not amplified, and ultimately generate a neutral value by the saturator 98 (e.g. 0 VDC).

Each algorithmic response equation may be unique to the respective loop controller 58, 60, 62. Additionally, the tolerances of the dead-zone function 94 and saturator 98 may be varied per loop controller 58, 60, 62, as necessary. While the described embodiment of the forward propeller controller 60 allows for manipulation of an analog signal, embodiments of the innovation are envisioned wherein the electrical signals are digital signals, and wherein feedback loop control operations may be executed by an executable program running on in any of the controllers 58, 60, 62, or a general purpose computer.

The turboprop control system 10 operates to control the turbine engine 12 and propeller 14 such that the system 10 controls the rotational speed of the turbine engine 12, the rotational speed of the propeller 14, and the propeller blade pitch 16, based on the pilot input from the power control lever 30. The power control lever 30 input is converted into a control signal 42 by the positional sensor 32. The EEC 24 receives the control signal 42, in addition to other sensor readings, for example, the altitude signal 44, and the fuel input signal 50.

The EEC 24 operates to control the propeller 14 operation by determining a desired propeller signal 64 in response to the control signal 42 and altitude compensator 56 signal, by performing, for instance, a look up operation in the propeller speed map 52. Additionally, the EEC 24 operates to control the turbine engine 12 operation by determining a desired engine speed signal 66 in response to the control signal 42 and altitude compensator 56 signal, by performing, for instance, a look up operation in the engine speed map 54.

The operation of the propeller 14 may further be defined by control signal 42 received. For example, if the power control lever 30 is positioned in the first position (forward thrust), the propeller speed map 52 produces a forward speed signal 70, which may be supplied to the forward propeller controller 60, and consequently, the second loop 86. Conversely, if the power control lever 30 is positioned in the second position (rearward thrust), the propeller speed map 52 may determine a reverse pitch signal 68, which may be supplied to the reverse propeller controller 58, and consequently, the first loop 82.

During forward operation, the forward propeller controller 60 and second loop 86 generate one of three distinct signals based on the comparison of the actual propeller speed signal 20 and desired forward speed signal 70, which is directly related to the control signal 42. If it is desired that the propeller 14 speed up, the forward propeller controller 60 generates a positive value, which in turn causes the second motor 78 to operate the propeller governor assembly 80 to decrease the propeller blade 16 pitch, thus increasing the propeller 14 speed. The second motor 78 will continue to operate the propeller governor assembly 80 to decrease the propeller blade 16 pitch until the pitch can no longer be decreased, or until the motor 78 receives a different signal from the forward propeller controller 60.

If it is desired that the propeller 14 slow down, the forward propeller controller 60 generates a negative value, which in turn causes the second motor 78 to operate the propeller governor assembly 80 to increase the propeller blade 16 pitch, thus decreasing the propeller 14 speed. The second motor 78 will continue to operate the propeller governor assembly 80 to increase the propeller blade 16 pitch until the pitch can no longer be increased, or until the motor 78 receives a different signal from the forward propeller controller 60.

In instances where the control signal 42 is static, the operation of speeding up and/or slowing down of the propeller 14 will ultimate equalize at a point wherein the forward propeller controller 60 generates a neutral value, which in turn holds the second motor 78 at its current actuation point. During this time, the propeller blade 16 pitch is neither increased nor decreased until the second motor 78 receives a different signal from the forward propeller controller 60.

Likewise, during reverse operation, the reverse propeller controller 58 and first loop 84 generate one of three distinct signals based on the comparison of the actual propeller pitch signal 82 and the desired reverse pitch signal 68. As explained above, the reverse operation uses a negative propeller blade 16 pitch such that rotation of the propeller 14 (in the same direction as if the aircraft was operating in a forward operation) generates reversed thrust. Similar to the forward operation, the reverse propeller controller 58 may generate a positive value (i.e. the desired reverse pitch is greater than the actual reverse pitch), which causes the first motor 72 to drive the worm drive 74, to modify the propeller blade 16 pitch to increase reverse thrust. When the reverse propeller controller 58 generates a negative value (i.e. the desired reverse pitch is less than the actual reverse pitch), the first motor 72 drives the worm drive 74, to modify the propeller blade 16 pitch to decrease reverse thrust. When the reverse propeller controller 58 generates a neutral value, neither the motor 72 nor the worm drive 74 are altered.

Regardless of which of the forward or reverse propeller controllers 58, 60 are utilized, the engine controller 62 and third loop 88 may generate one of three distinct signals based on the comparison of the actual engine speed signal 18 and the desired engine speed signal 66. When the engine controller 62 generates a positive value (i.e. the desired engine speed is greater than the actual engine speed), the fuel metering unit 26 increases the turbine engine 12 rotation speed. When the engine controller 62 generates a negative value (i.e. the desired engine speed is less than the actual engine speed), the fuel metering unit 26 decreases the turbine engine 12 rotation speed. When the engine controller 62 generates a neutral value, the turbine engine 12 maintains its current speed.

It is envisioned that the individual operation of the three closed loops 84, 86, 88 may create some variance in the operating speeds of the propeller 14 and turbine engine 12. For instance, an increase in speed of the turbine engine 12 (via the third loop 88) may create an increase in actual speed of the propeller 14. It is envisioned these interactions between the closed loops 84, 86, 88 may reach an ultimate equilibrium by way of the algorithmic response equations, which operate to constantly direct the respective loop controllers 58, 60, 62 towards the desired operating speeds.

Figure 5:
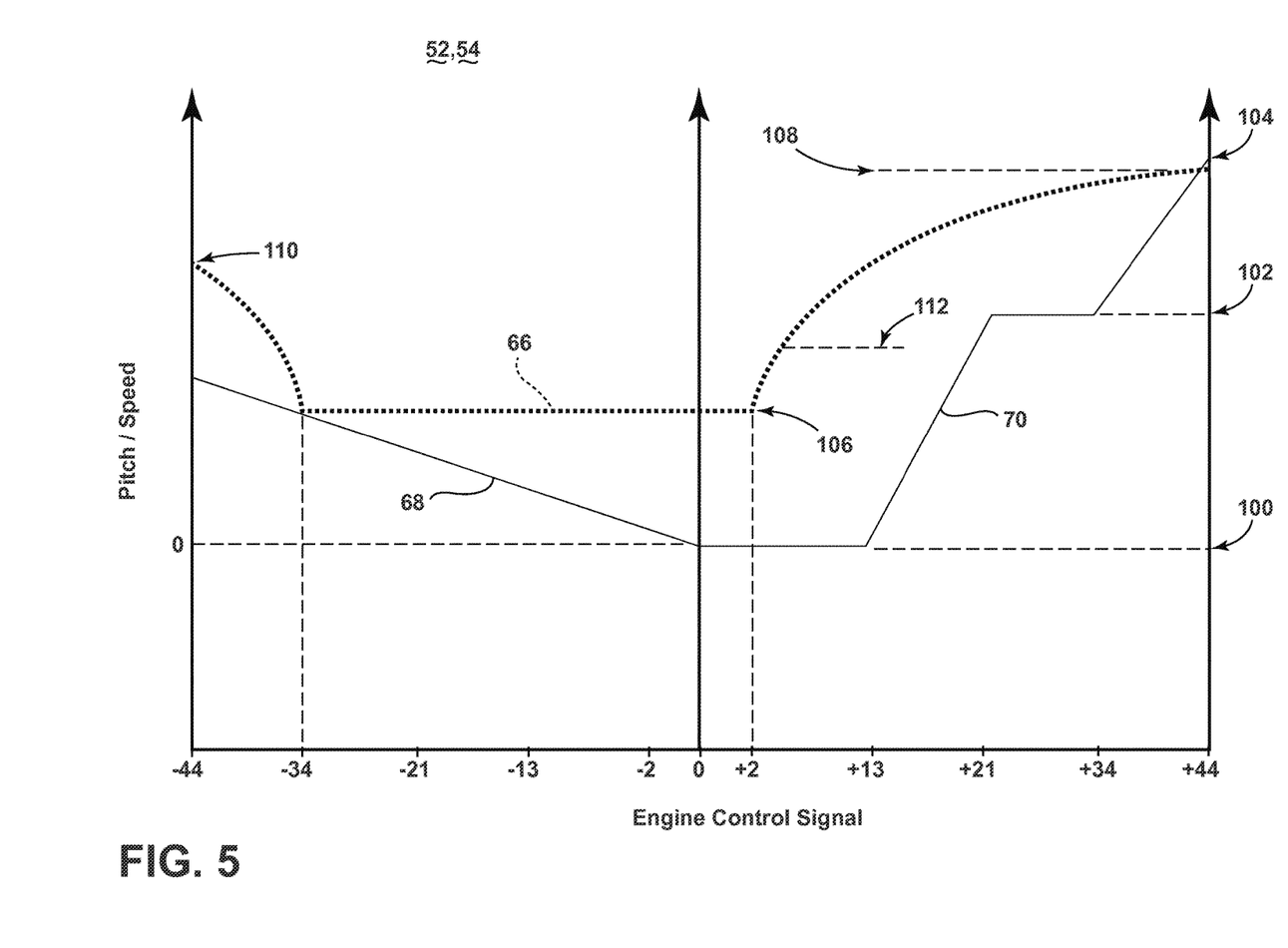
FIG. 5 is an example of a combined propeller speed map and engine speed map, in accordance with various aspects described herein.

FIG. 5 illustrates one non-limiting graphical representation of a combined propeller and engine speed map 52, 54. As shown, the propeller speed map 52 aspects may include defined values for the desired forward speed signal 70 and desired reverse pitch signal 68 (defining pitch angle), as a function of control signal 42, as well as a minimum propeller speed limit 100, expected cruise propeller speed 102, and maximum propeller speed 104, which occurs during takeoff. The diagram also illustrates aspects of the engine speed map 54, and may include defined values for the desired engine speed signal 66 as a function of control signal 42. These aspects of the engine speed map 54 may include a minimum engine speed during ground idle 106 (in forward and reverse thrust operations), a maximum forward thrust engine speed 108, maximum reverse thrust engine speed 110, and a minimum flight idle engine speed 112. Additionally, while the desired engine speed signal 66 aspects may appear parabolic for portions of the engine speed map 54, it is envisioned the parabolic response, in combination with the propeller speed map 52 values, may provide a linear thrust and/or linear power response for the aircraft, as described above. Alternative propeller speed maps 52 and engine speed maps 54 are envisioned. Additionally, while FIG. 5 illustrates a representation of both maps 52, 54 in a single graph, it is envisioned that both maps 52, 54 may not reside in the same components or locations. Independent map 52, 54 representation may be envisioned.

Figure 6:
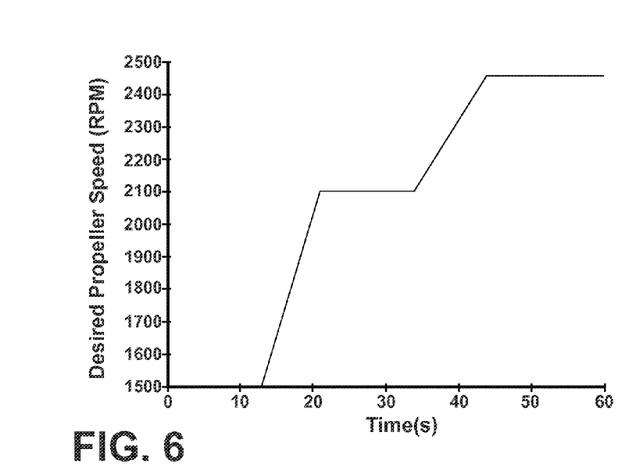
FIG. 6 is an example graph of the desired propeller speed as a function of time, in accordance with various aspects described herein.
Figure 7:
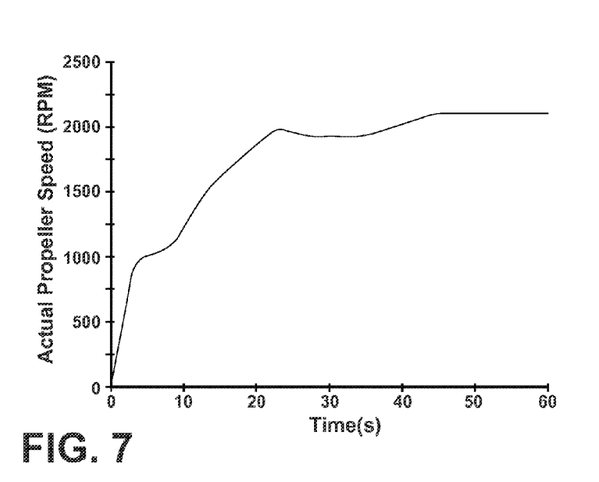
FIG. 7 is an example graph of the actual propeller speed as a function of time, in accordance with various aspects described herein.
Figure 8:
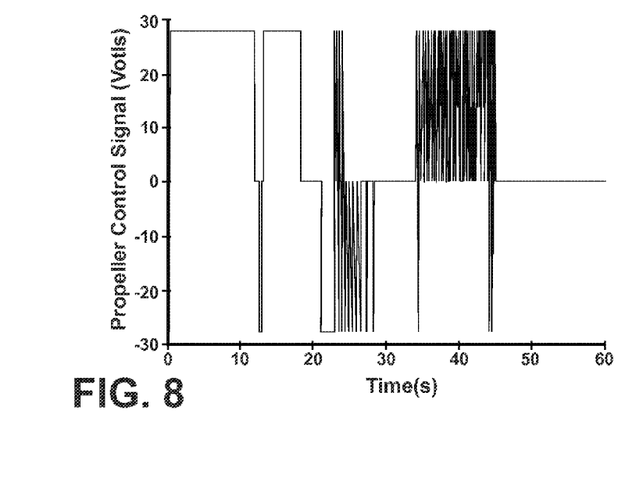
FIG. 8 is an example graph of the propeller control signal as a function of time, in accordance with various aspects described herein.
Figure 9:
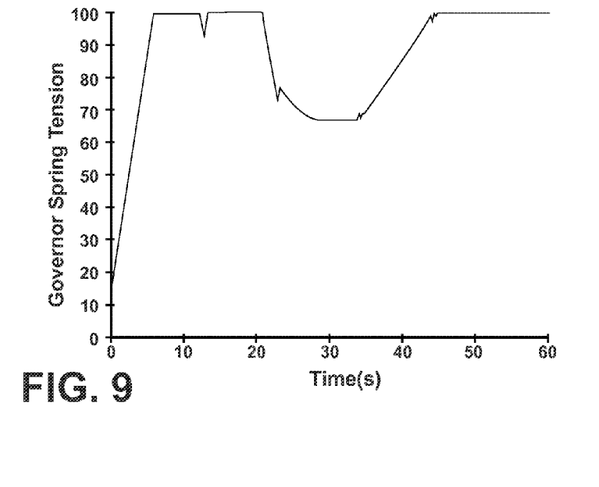
FIG. 9 is an example graph of the speeder spring force as a function of time, in accordance with various aspects described herein.

FIGS. 6 through 9 illustrate one non-limiting example of the turboprop control system 10 operation according to one embodiment of the innovation, wherein, for example, a pilot adjusts the power control lever from 0 degrees to +44 degrees. FIG. 6 illustrates the desired propeller speed signal 66, measured in RPMs, as a function of time. Also as shown, the desired propeller speed signal 66 does not immediately change from zero RPMs to the maximum value, as the maximum slope or maximum acceleration may be limited by the propeller speed map 52, as explained above. FIG. 7 illustrates the actual propeller speed signal 20, measured by the propeller 14. FIG. 8 illustrates the resultant propeller control signal 48 generated by the forward propeller controller 60, as a function of time, when performing the comparison operations on the desired propeller speed signal 70 and actual propeller speed signal 20. As shown in FIG. 8 and described above, the possible outputs of the propeller control signal 48 are a positive value, a negative value, and a neutral value. FIG. 9 illustrates the governor spring tension of the propeller governor assembly 80, measured as a percentage, as a function of time. As shown, a positive corresponding propeller control signal 48 produces an increase in spring tension of the propeller governor assembly 80, while a negative value reduces tension of the assembly 80.

Many other possible embodiments and configurations in addition to that shown in the above figures are contemplated by the present disclosure. For instance, the EEC 24 may be configured with additional indicators to indicate to the pilot when the EEC 24 may be non-operational, for instance, when the emergency control lever 38 was engaged. Additionally, the design and placement of the various components may be rearranged such that a number of different in-line configurations could be realized.

The embodiments disclosed herein provide a turboprop control system capable of controlling turboprop turbine engine and propeller operations, via a closed loop system, from a single pilot-controlled lever. One advantage that may be realized in the above embodiments is that the above described embodiments provide a turboprop control system that requires only a single lever to be actuated by the pilot. Thus the control system provides a control system that reduces pilot workload (to only a single lever), allowing the pilot to better focus attention on other needs.

Another advantage that may be realized in the above embodiment is that the above described embodiments provide a control system that incorporates sensors, readings, predetermined control maps, system limiters, and pilot input to develop a stable and reliable system, which prevents adverse operating conditions such as over or under speed of either the engine or propeller, over-temperature conditions for the engine, over-torque, compressor stall, combustor blowout, surge, and flame-out during aircraft operation. Additionally, some pilot errors may be prevented by the above described limiters within the system, increasing reliability and safety of the aircraft. Furthermore, the shaping functionality of the second order phase-lead controller prevents dramatic oscillations in operation signals, further increasing operational stability.

Yet another advantage that may be realized in the above embodiments is that the above described system provides a completely electrical (fly-by-wire) control system that eliminates the need for several mechanical connections between the control lever(s) and the aircraft. The elimination of the mechanical connections allows for reduced weight and size design requirements for the aircraft. Reduced weight and size correlate to competitive advantages during flight.

Yet another advantage that may be realized in the above described embodiments is that the control system may allow for pilot-selected or automatically determined profiles which may provide an additional focus on efficiency for the control system operation, for instance, fuel efficiency, time efficiency, or propeller efficiency.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling the operation of an aircraft turboprop engine having a turbine engine operably coupled to and rotating a propeller having propeller blades, the method comprising:
   receiving a position input from a single input device on a flight deck of the aircraft;
   converting the position input into a turbine engine setting and a propeller setting;
   controlling rotational speed of the turbine engine according to the turbine setting based on the comparison of an actual engine speed signal and a desired engine speed signal; and
   controlling at least one of propeller speed and pitch according to the propeller setting based on the comparison of a desired forward speed signal and an actual forward speed signal;
   wherein controlling comprises receiving by a controller the desired forward speed signal and the actual speed signal of the rotor and the propeller, summing the desired forward speed signal and the actual speed signal, providing the summation to a first amplifier through a phase-lead controller, providing the output of the first amplifier to a dead-zone function to generate a variable output signal except when the input signal is between an upper and lower defined signal boundary, processing the variable output signal by a second amplifier and saturating the values of the variable output signal obtained from the second amplifier into a distinct positive value or a negative value or a neutral value indicating increase in speed or decrease in speed or no speed change respectively for the rotor and the propeller.

2. The method of claim 1 wherein the receiving a position input is indicative of the position of the single input device relative to an operational range of the single input device.

3. The method of claim 2 wherein the single input device is a lever and the operational range is a physical range of movement of the lever.

4. The method of claim 2 wherein the operational range of the single input device includes a first portion corresponding to forward movement of the aircraft and a second portion corresponding to rearward movement of the aircraft.

5. The method of claim 1 wherein the converting the position input into a turbine engine setting comprises mapping the position input to a turbine engine setting according to a predetermined engine map having corresponding position input values and engine settings.

6. The method of claim 5 wherein the predetermined engine map is configured to provide for a linear thrust response from the turbine engine for at least a range of movement for the single input device corresponding to forward thrust.

7. The method of claim 1 wherein converting the position input into a propeller setting comprises mapping the position input to a propeller setting according to a predetermined propeller map.

8. The method of claim 7 wherein the predetermined propeller map has a linear relationship between the position input and a propeller pitch for rearward movement of the aircraft.

9. The method of claim 7 wherein the predetermined propeller map has a propeller speed setting and a pitch setting for different flight regimes.

10. The method of claim 9 wherein the different flight regimes comprise at least taxi, cruise, and takeoff, and are determined based on position input.

11. The method of claim 10 wherein the predetermined propeller map provides for maximum thrust during cruise.

12. The method of claim 1 wherein the propeller setting provides for a constant propeller speed while setting the pitch in response to the position input.

13. The method of claim 1 wherein the converting the position input into a turbine engine setting and a propeller setting comprises applying an engine speed map and a propeller speed map to convert the position input to an engine speed for the engine speed setting and a propeller speed setting for the propeller setting.

14. The method of claim 13 wherein the engine speed map sets the engine speed to produce a linearly increasing amount of power, and the propeller speed map sets the propeller speed to optimize thrust provided for the amount of power.

15. The method of claim 13 wherein, for rearward movement of the aircraft, further comprising applying a reverse propeller pitch map to set a negative pitch for the propeller blades.

16. A turboprop control system for use with a turboprop comprising a turbine engine operably coupled to and rotationally driving a propeller having variable pitch blades to control the engine speed, propeller speed, and propeller pitch, the turboprop control system comprising:
 a control input device, located within a cockpit of an aircraft, and having an operational range and providing a control signal indicative of an input selection within the operational range; and
 a controller receiving the control signal and having an engine speed map and a propeller speed map as a function of the control signal, wherein the controller applies the engine speed map and the propeller speed map to the received control signal to set an engine speed and a propeller speed for the turboprop;
 wherein the controller comprises:
  a summation unit to sum a desired forward speed signal and an actual speed signal for the rotor and the propeller;
  a first amplifier coupled to the summation unit through a second order phase-lead controller to amplify the received signal from the summation unit;
  a dead-zone function coupled to the amplifier that provides variable output signal to a second amplifier except when the input signal is between an upper and lower defined signal boundary; and
  a saturator coupled to the second amplifier for saturating the signal into a distinct positive value or a negative value or a neutral value indicating increase in speed or decrease in speed or no speed change respectively for the rotor and the propeller.

17. The turboprop control system of claim 16 wherein the control input device is operable through a physical range of motion to define the operational range.

18. The turboprop control system of claim 17 wherein the control input device is a lever physically movable through a predetermined physical range of motion.

19. The turboprop control system of claim 17 wherein a first portion of the range of motion corresponds to a forward movement of the aircraft and a second portion of the range of motion corresponds to a rearward movement of the aircraft.

20. The turboprop control system of claim 19 wherein the controller further has a propeller pitch map, and the controller sets the propeller pitch to a negative pitch when the control input device is located within the second portion.

21. The turboprop control system of claim 16 wherein the engine speed map and propeller speed map are configured to provide a linear thrust response from the turboprop for at least a portion of the operational range corresponding to forward movement of the aircraft.

22. The turboprop control system of claim 21 wherein the propeller speed map is configured to optimize at least one of: propeller efficiency for the corresponding engine speed, fuel efficiency, or flight time.

23. The turboprop control system of claim 22 wherein the optimal propeller efficiency accounts for at least one of altitude, airspeed, engine speed, propeller speed, or propeller pitch.

24. The turboprop control system of claim 16 wherein the controller further comprises a closed loop control which receives the set engine speed to control the speed of the engine.

25. The turboprop control system of claim 24 wherein the controller further comprises a closed loop control which receives an actual engine speed from the engine.

26. The turboprop control system of claim 24 wherein the controller further comprises a closed loop propeller control which receives the set propeller speed to control the speed of the propeller.

27. The turboprop control system of claim 26 wherein the closed loop propeller control further comprises an executable program running on a general purpose computer.

28. The turboprop control system of claim 27 wherein the controller further comprises a closed loop propeller control which receives an actual propeller speed from the propeller.

29. The turboprop control system of claim 28 wherein the closed loop propeller control further comprises a propeller control circuit configured to provide one of three distinct output signals according a comparison of the set propeller speed and the actual propeller speed: a first output signal if the actual propeller speed is less than the set propeller speed, a second output signal if the actual propeller speed is greater than the set propeller speed, and a third output signal if the actual propeller speed is equal, or within a tolerance, of the set propeller speed.

30. The turboprop control system of claim 29 wherein the propeller pitch is further controlled by the output signal of the propeller control circuit controlling an actuator for actuating a governor spring of a propeller governor assembly.

* * * * *